July 4, 1961 K. KORDESCH 2,991,412
OXYGEN ANALYZER
Filed March 12, 1958 2 Sheets-Sheet 1
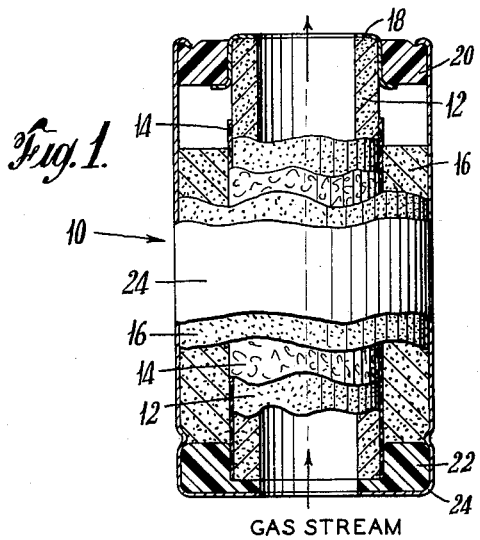
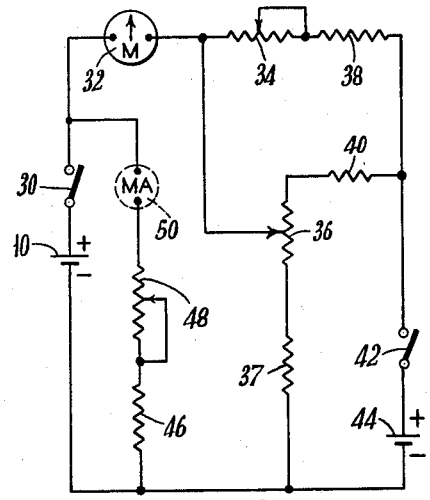
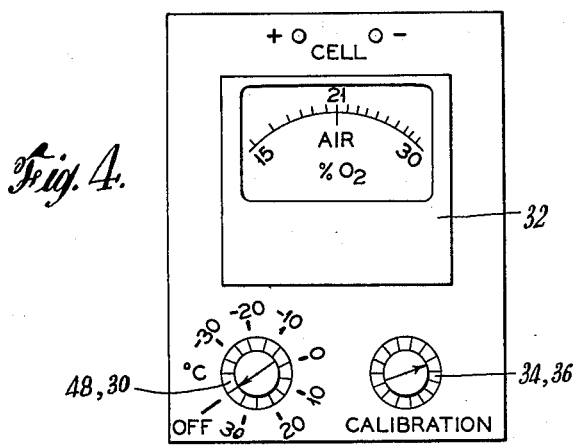
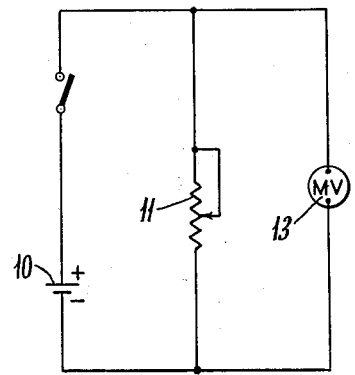
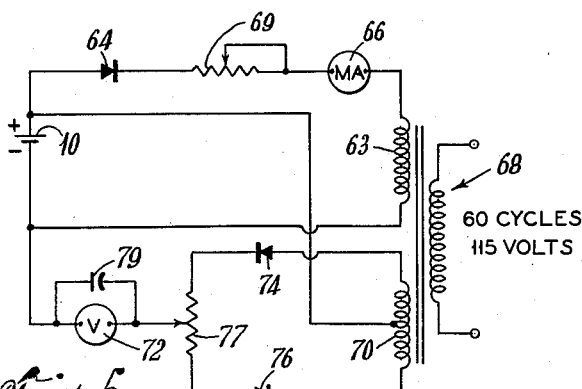
INVENTOR.
KARL KORDESCH
BY
ATTORNEY July 4, 1961  K. KORDESCH  2,991,412
OXYGEN ANALYZER Filed March 12, 1958  2 Sheets-Sheet 2

INVENTOR.
KARL KORDESCH
BY
John F. Hohmann
ATTORNEY

United States Patent Office 2,991,412
Patented July 4, 1961

2,991,412
OXYGEN ANALYZER
Karl Kordesch, Lakewood, Ohio, assignor to Union Carbide Corporation, a corporation of New York
Filed Mar. 12, 1958, Ser. No. 721,028
3 Claims. (Cl. 324—29)

This invention relates to an oxygen analyzer for determining the concentration of this gas in gaseous mixtures.

Chemical methods for oxygen determination in gases are well known. Most of them are based on the principle of measuring the volume decrease resulting from absorption or combustion reactions. Other methods, more suitable for use in automatic gas analyzers, are based on the physical properties of oxygen, such as its heat of reaction, heat conductivity and paramagnetism.

None of the above methods is entirely specific for oxygen, so that appreciable efforts together with expensive instrumentation are required to obtain satisfactory results. These problems are further aggravated where complicated gas mixtures must be analyzed, and if automatic control or unattended operation are desired. A need for a simple and selective oxygen analyzer thus exists.

It has already been suggested to use as the principle of operation of oxygen-analyzing equipment, the electrochemical activity of oxygen acting on a carbon or metal electrode, serving as the cathode of a galvanic element, in, for example, the so-called "Fery" cell. This type of cell uses ambient oxygen to depolarize its cathode. As the extent of depolarization depends on the amount of oxygen reaching the cathode-electrolyte interface, it early became obvious that such a cell could be used to determine the oxygen concentration of gases passing therethrough. Contrary to reasonable expectations, the results of this approach have not been too encouraging. In the first place, it was observed that carbon electrodes did not give reproducible results over prolonged periods. Secondly, electrochemical changes, occurring as discharge progresses, were found to cause voltage irregularities which reflected in the accuracy of the instrument readings. Additionally, the circuiting of the analyzer apparatus did not compensate for variable electrical characteristics of the sensing cell, such as internal resistance, or variation of depolarization rate with changing temperatures, with the result that further inaccuracies crept into observed data.

The main object of this invention accordingly is to provide an oxygen-analyzing instrument characterized by great simplicity of construction and operation, but nevertheless capable of furnishing highly reproducible results over a wide range of oxygen concentrations.

Another object of the invention is to provide an instrument of the character described, which can be easily and rapidly calibrated.

A still further object of the invention is to provide a portable oxygen analyzing instrument easily adaptable to semi-automatic and recording devices.

These and other objects and features of the present invention will be more readily apparent as the description thereof proceeds, especially when examined in conjunction with the accompanying drawing in which:

FIG. 1 is a cross-sectional view of a measuring cell employed by the instrument of the invention;

FIG. 2 is a circuit diagram for one version of the invention;

FIG. 3 is a circuit diagram for another version of the invention;

FIG. 4 shows the front control panel of the analyzer of FIG. 3;

FIG. 5 is a circuit diagram of a gating circuit used with the instrument;

Figure 6:
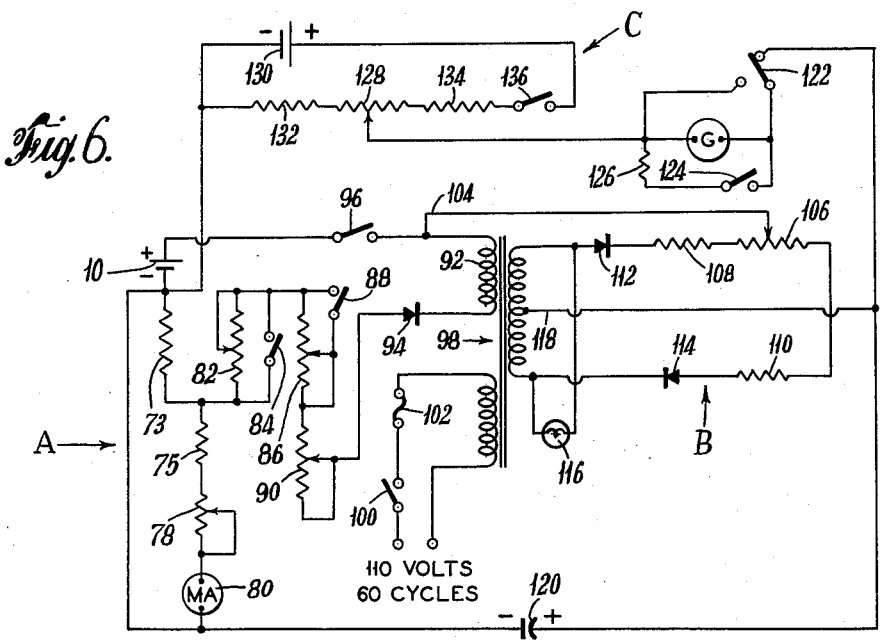
FIG. 6 is a circuit diagram of another embodiment of the invention.

The device of the invention comprises a circuit including an air-depolarized cell having a porous activated and catalyzed polarizable cathode exposed to the gaseous mixture whose oxygen content is to be measured and, optionally, associated with it, means for applying an external unidirectional polarizing voltage load across the cell, this voltage being adapted to produce polarization of the cell cathode manifested by detectable change in voltage produced by the cell under the depolarizing influence of oxygen in the mixture passed therethrough. Associated with the cell are voltage or current measuring means for recording directly the voltage or current produced by the cell as a measure of the content of oxygen in the mixture as determined by the partial pressure of oxygen therein. Similarly, further modifications of the device may include voltage load adjusting means connected in parallel across the air-depolarized cell for compensating against partial pressure changes in oxygen and variations in cathode polarization resulting from temperature changes.

In the device of the invention the cathode of the air-depolarized oxygen-sensing cell, operating in alkaline electrolyte, forms a reversible $H_2O_2$ electrode, the electro-motive force of which is a function of the partial pressure of oxygen in the gas mixtures diffusing to the carbon-electrolyte interface.

The open circuit voltage of an oxygen depolarized carbon electrode changes in accordance with the Nernst equation, i.e., about 29 mv. per tenfold change in oxygen pressure, a change usually exceeded by potential changes caused by temperature and humidity fluctuations. The potential of the oxygen electrode under load condition is a more sensitive function of the oxygen supply to the carbon. In addition, equilibrium concentration on the carbon surface is reached quickly because the load current establishes a "dynamic equilibrium" in contrast to the "static equilibrium" measured with a millivoltmeter in open circuit condition.

A cell 10 designed for the present analyzer is shown in FIG. 1. It consists of a metal can 24, open at both ends, a tubular activated and catalyzed carbon electrode 12 in the center, a separator 14, a mixture of zinc powder, KOH and a gelling agent as combined electrolyte and non-polarizing anode 16. A metal cap (tin or silver coated) 18 serves as the anode collector and the negative terminal. Two insulating rings 20 and 22, each having a recessed shoulder, separate cell can 10 from cathode 12, at its extremities. The bottom of open ended metal container 24 serves as the positive terminal for the cell.

The carbon electrode used preferably delivers a current of about 10 ma./cm.$^2$ of electrode surface without being appreciably polarized. The cathode is treated, before use, according to the processes disclosed in U.S. Patents 2,615,932 or 2,669,598, such that the cathode contains within its pores and at its surface a spinel type catalyst consisting of an oxide of a heavy metal (R) and of aluminum oxide ($RO \cdot Al_2O_3$). The cathode voltage against zinc is at least 1.2 volts.

The preferred electrolyte for this cell is potassium hydroxide for the effect of temperature variations on voltage and current density values is far smaller therewith than it is with NaOH or $NH_4Cl$ electrolytes. Suitable gelling agents for this electrolyte include sodium-carboxymethyl cellulose and starch.

The high surface-powdered amalgamated zinc contained in the electrolyte, in an amount that assures electronic conductivity, performs effectively as a non-polarizing anode. Furthermore, a constant zincate concentration is established since zinc oxide formed during the cell operation precipitates continuously from the saturated electrolyte.

The electronic conductivity of the zinc powder-electrolyte mixture makes it necessary to use a separator between carbon electrode and electrolyte-anode element. Cellophane or regenerated cellulose perform satisfactorily as semi-permeable membranes.

For use in certain analyzers of the present invention, it is preferable to use a special cell conforming generally to the above description. This cell employs as the anode thereof, instead of zinc, compressed discharged $MnO_2$, copper oxide or other material having a voltage between 1.4 volts and 1.2 volts with respect to zinc, but slightly lower than the oxygen electrode, together with graphite and an inorganic cement binder suspended in alkaline electrolyte. Since the potentials of the carbon cathode and of its companion anode are very close, one obtains a maximum differential effect when the oxygen concentration in the depolarizing atmosphere changes. Example: When air-depolarized, this cell produces only a few millivolts; with pure oxygen the voltage is 50 millivolts. Therefore, the scale of a millivoltmeter can be calibrated to indicate oxygen percent directly. The need for a voltage compensating circuit for zero adjustment is eliminated in many cases. The instrument is set to the reference point by applying a small load in series with the cell.

In accordance with the present invention, circuits responsive to oxygen partial pressure in a gas mixture may be constructed to perform under the following conditions:

(a) Measurement of voltage at a constant load;
(b) Measurement of current flow at a predetermined voltage;
(c) Measurement of output by means of a wattmeter.

Circuits for measurement (a) are the simplest, but practical only if small changes in oxygen concentrations are expected. They are embodied in a simple portable oxygen indicator with a range of 15 to 30 percent $O_2$. Measurements (b) and (c) are for gases, the oxygen content of which might vary between wide limits, e.g., 0.1 to 100 percent $O_2$. Such circuits need a current regulating device (manually or automatically operated) to adjust the load to a value corresponding to a voltage level determined by calibration with air. These circuits can be embodied in a gas analyzer with two ranges: 0.1 to 4 percent and 2 to 30 percent $O_2$. Method (c) exhibits a greater accuracy than method (a), but also has certain range limitations.

A circuit diagram of a simple embodiment of the invention appears on FIG. 2. As shown, this analyzer consists of a cell 10 having a voltage when air depolarized and under load of 0.00 volt; connected across this cell is a variable resistor of about 50 ohm rating 11 and a millivoltmeter 13. This analyzer is calibrated with air by adjusting the load across the cell, and changing the resistance until the millivoltmeter reads 0. Subsequently, the gaseous mixture to be analyzed is passed through sensing cell 10, and the percentage of oxygen present therein is read directly on the meter, the variation of voltage being some 29 millivolts per tenfold change in oxygen pressure.

The above analyzer is portable. It performs best with atmospheres containing from 10 to 100 percent oxygen. It is not used where the oxygen content is below 10 percent, because the voltage of the sensing cell under such conditions would drop too fast, and could not be compensated.

A further circuit is shown in FIG. 3. This circuit includes the previously described oxygen-sensing cell 10. In electrical connection with the positive terminal thereof is a suitable switch 30. Also in contact with switch 30 is a milliammeter 32 rated at 30 ohms/1 milliampere. Connected to milliammeter 32 are rheostats 34 and 36 having a maximum resistance of 50 ohms and 25 ohms, respectively. These rheostats are separated by fixed resistors 38 and 40 rated at 50 ohms and 5 ohms, respectively. Resistor 40 is also connected in series through switch 42 with the positive terminal of compensating cell 44. This cell suitably may be an F-size Le Clanche cell. Rheostat 36 is also connected in series with cell 44 through 30 ohm resistor 37. Together rheostats 34 and 36 form a wide resistance range potentiometer. Connected in series with respect to cell 44, but in parallel with respect to cell 10 is a circuit consisting of fixed resistor 46, rheostat 48 and milliammeter 50. The operation of the instrument is as follows.

Air is blown through the cell and switches 30 and 42 are closed. The rheostat 48 is set for the temperature range in which the measurement is made. This load adjustment is necessary to assure the same sensitivity against oxygen partial pressure changes, and compensates for variations in cathode polarization resulting from temperature changes. Table I below lists polarizing currents at various temperatures for an instrument having a sensing cell 10 with the indicated dimensions.

TABLE I

*Polarizing currents at various temperatures*

[Tubular Electrode With the Dimensions: 12 mm. I.D., 20 mm. O.D., Electrode Surface: 20 cm.$^2$]

| | | | |
|---|---|---|---|
| 30° C. | 240 ma. | 0° C. | 180 ma. |
| 20° C. | 220 ma. | −10° C. | 160 ma. |
| 10° C. | 200 ma. | −20° C. | 140 ma. |

The voltage divider 36 across auxiliary battery 44 makes it possible to bring the pointer of the meter 32 into the center position, corresponding to 21 percent $O_2$ on the scale. Rheostat 34 provides fine adjustment for easier handling. The instrument is considered calibrated as soon as the pointer stops moving; usually equilibrium is reached within 10 to 20 seconds.

After calibration is finished, the unknown gas is passed through the cell. The pointer responds immediately, and its rest point indicates directly the percentage of oxygen in the sample.

If, after analysis, normal air is passed through the cell, the pointer should again indicate 21 percent $O_2$, the initial calibration value. FIG. 4 illustrates the front panel arrangement of the apparatus and the indicating scale. The left knob operates rheostat 48, and the on-off switch 30. The right knob controls a potentiometer with a wide resistance range, e.g., a "helipot" or multiple turn potentiometer combining 34 and 36 in one unit.

The above-described analyzer may be used also over a wider range from 0.1 to 4 percent and 2 to 30 percent $O_2$. In order to obtain this range of operation, it is necessary to change the load current in accordance with the oxygen content of the gas. For measurement the current is (with the help of the meter 32) adjusted to the same voltage level established with air during calibration. The voltage divider serves as a "voltage memory device." The oxygen content of the gas is indicated by a calibrated milliammeter 50 in the load circuit (dotted in FIG. 3).

In actual use in (b) type measurements, it has been established that a changing current necessarily changes the potential drop across the internal (ohmic) resistance of the cell; therefore, the apparent cell voltage varies with changing load and the balance with the previously fixed reference voltage of the voltage divider is upset. This means a constant deviation correctable in the calibration curve if the internal resistance of the detecting cell remained constant. Unfortunately, the ohmic resistance changes in an irregular manner, depending mainly on surface wetting phenomena of a complex nature. This difficulty is eliminated by using a pulse-current load and measuring the cell voltage between the pulses. Shifts in equilibrium on the carbon surface are relatively sluggish processes, and do not follow rapid interruptions of the current. The voltage remains at a state corresponding to the average current flow. The potential drop across the internal resistance disappears practically immediately as soon as the current is interrupted; therefore, the voltage measured in an open current voltage in effect represents a loaded condition. Current interruptions can be made by means of a switch circuit (battery operated vibrator for portable analyzers or an A.C. operated rectifier-gating-circuit for laboratory instruments). The switching time cycle is not critical; any frequency between 30 cy. and 500 cy. is usable for this purpose.

FIG. 5 shows the A.C. load circuit with out-of-phase gating circuit. Starting with the oxygen cell 10, it will be seen that the same is loaded through its positive terminal by 60 cycle current pulses coming from the 5 volt step-down transformer winding 63 of transformer 68 through rectifier 64; connected in series between rectifier 64 and cell 10 are an ammeter 66 and a rheostat 69, the ammeter indicating the average current flow which is adjustable by the rheostat. The center tap winding 70 of transformer 68 is also connected to the positive terminal of cell 10. This winding is rated at 6 volts, and is used to connect a high resistance voltmeter 72 to the cell 10 terminals during the off-current period. As shown, two small diode rectifiers 74 and 76 properly polarized are present in the gating circuit of which winding 70 forms part. A potentiometer 77 is in series between the gating circuit and voltmeter 72, which has in parallel with it a capacitor 79. In operation, the potentiometer is adjusted so no potential difference exists between its center tap and slide wire contact. This compensated bridge circuit has a very low (forward) resistance in one phase of the A.C. cycle, and a very high (backward) resistance in the opposite phase. If the 5-volt (load) winding and the 6-volt (gating) winding are 180° out of phase, the circuit works the same way as with a vibrator-type switch. The advantage for the A.C. circuit is that no mechanically moving parts are used.

In FIG. 6 is shown a schematic circuit diagram of the gas analyzer of the invention. It will be seen from this diagram that the instrument can be visualized as consisting of three basic elements: a transformer rectifier circuit containing an oxygen-depolarized cell (A), a gating circuit (B) connected to circuit (A) through the positive terminal of its cell, and a compensating circuit (C) connected to circuit (A) through the negative terminal of its oxygen-depolarizer cell.

The transformer-rectifier circuit (A) includes the cell 10, to the negative terminal of which is connected in series fixed resistor 73 rated at 4 ohms. Through this resistor is connected a temperature compensation control circuit in this case affecting the sensitivity of the meter 80. This circuit contains in series connection with resistor 73, fixed resistor 75 rated at 1400 ohms, and rheostat 78 rated at 10,000 ohms. Between rheostat 78 and the negative terminal of cell 10 is a suitable current indicating device such as a milliammeter 80. Also connected through resistor 73 is rheostat 82 rated at 10 ohms, across the terminals of which lies switch 84. Connected to one pole of switch 84 is rheostat 86 rated at 500 ohms and controlled by switch 88. In series with rheostat 86 is a second rheostat 90 of lower resistance (75 ohms). Rheostat 90 is connected to the 5 volt winding 92 of transformer 98 through rectifier 94. The other terminal of winding 92 is connected to the positive terminal of cell 10 through relay 96. Completing circuit (A) is a source of 60 cycle 110 volt current connected to the primary winding of transformer 98 through switch 100 and safety fuse 102. In the above control circuit, rheostat 86 provides rough adjustment of the pulse current and fine adjustment is obtained with rheostat 90. A tap 104 on the connection leading from transformer winding 92 to the positive terminal of cell 10 links this cell to gating circuit (B) through rheostat 106. The terminals of rheostat 106 are connected to the 6 volt winding of transformer 98, through fixed resistors 108 and 110, each rated at 50 ohms, and diode rectifiers 112, 114. In parallel across the transformer is a small pilot light 116. A center tap 118 on the 6 volt winding connects this circuit to milliampere meter 80 of circuit (A) and thence to the negative terminal of cell 10 via an 80 microfarad capacitor 120. Tap 118 also connects gating circuit B with compensating circuit (C) through switch 122 of galvanometer G connected in parallel also across switch 124 through 12 ohm resistor 126. In series with galvanometer G is 50 ohm potentiometer 128 connected in parallel across compensating cell 130 (of 1.3 to 1.6 volts) through 140 ohm resistor 132, 40 ohm resistor 134 and switch 136. A connection links resistor 132 to the negative pole of cell 10 such that this cell is in parallel with cell 130.

In the above described analyzer, correction for various temperatures is made with resistance 78. The air calibration standard (e.g., 100 milliamperes at room temperature) is indicated by the 21 percent oxygen mark on the upper meter scale shown on FIG. 3, and a setting of resistance 78, marked with 20° C. (room temperature). By adjusting resistance 78 to the other temperature markings (empirically found) the calibration mark of 21 percent holds true regardless of the temperature.

Operation of the instrument:

(1) *Calibration.*—To avoid accidental polarization of the indicating "Air Cell," such as might occur in a closed system, i.e., where the gas is introduced through a hose, air must be passed through the cell prior to turning the main switch to the "on" position. After the system has been flushed in this manner, the temperature range control rheostat 78 is set to the proper temperature and milliammeter 80 brought to the 21 percent mark by adjusting rheostats 90 and 86. In this manner, the cell is polarized with the standard current. After a few seconds, a potential level is reached corresponding to the electrochemical equilibrium on the carbon surface. Next, the voltage divider circuit containing potentiometer 128 is balanced so that the galvanometer pointer (G) goes to the center position. The instrument is considered air-calibrated as soon as the galvanometer pointer comes to rest.

(2) *Measurements.*—When the unknown gas is pumped into the electrode opening at the bottom of cell 10, the galvanometer pointer moves to one side or the other, depending on whether the gas has a higher or lower oxygen content than air. By means of the current control (86, 90) the current flow is adjusted until the galvanometer (G) is back in center position, indicating the same potential level as shown with air. The current flow, indicated by the milliammeter 80, is a function of the oxygen content of the gas. The current drawn is 100 ma. at the air calibration point, less at lower oxygen contents, and more at a higher oxygen percentage. The ammeter can, therefore, be calibrated to read directly the percent $O_2$, e.g., as shown in FIG. 4. An ammeter with two ranges as shown in FIGS. 7 and 8 can also be used, and if the oxygen content is such that the instrument cannot be brought to balance on the higher range, it is switched to the lower range.

(3) *Checking.*—Checking is done by again passing air through the cell with the current control set to 21 percent. The galvanometer should return to center position without adjustment of the voltage control.

Figure 7:
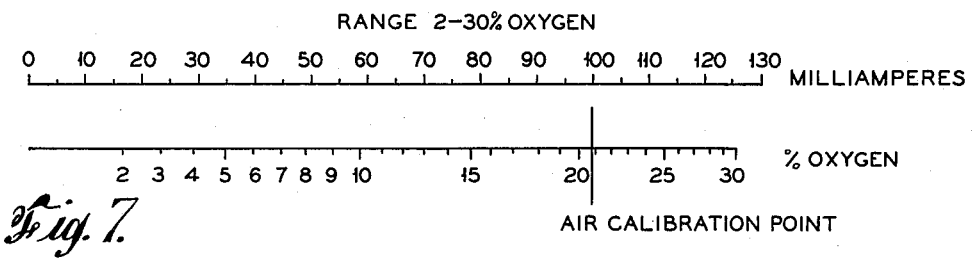
FIGS. 7 and 8 are calibration curves for the instrument of the invention.
Figure 8:
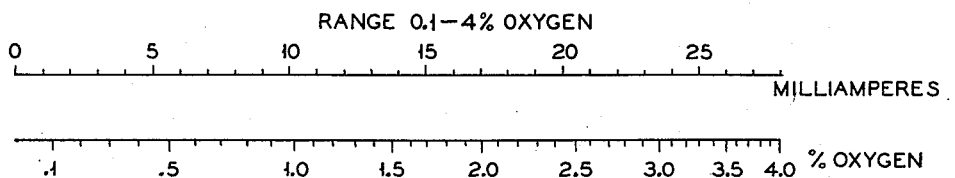

FIGS. 7 and 8 show the calibration of scales for two ranges, and the relationship between the current and percent $O_2$ values. Current at the air mark is equal to 100 ma. The calibration figures are for an analyzer using a 20 cm.$^2$ carbon electrode in conjunction with a 9 N KOH-zinc powder electrolyte.

The analyzer of this invention will not function properly with gases containing chlorine or oxides of nitrogen in addition to oxygen, because these gases also act as depolarizers. Organic impurities are not critical as long as they do not block the carbon surface as, e.g., carbon disulfide or acetone does, if present in an amount over 1 percent. Since acetylene is highly adsorbed by the carbon, it decreases the sensitivity to oxygen, and interferes with accurate measurements. $CO_2$ and CO are not critical under 10 percent. Hydrogen is adsorbed less readily than nitrogen. An instrument which is calibrated with air (78 percent $N_2$) will give a high reading with an oxygen-hydrogen mixture, a fact which must be considered in basic calibration of the scale.

The lowest oxygen content which can be measured is in the magnitude of 0.02 percent oxygen. An accuracy of ±0.01 percent is obtained if a reference gas is used for comparison.

Analysis of nearly pure oxygen (95 to 100 percent $O_2$) requires calibration with oxygen of a known percentage (e.g., from a steel cylinder); an air calibration would be too inaccurate in this case.

As a precautionary measure, the gas to be analyzed should pass through a drying system to remove excess water vapor if continuous operation of the instrument is necessary. At the same time, the above enumerated interfering contaminants may be removed by methods well known to those skilled in gasometric analysis.

What is claimed is:

1. A device for determining the oxygen content in a gaseous mixture to be analyzed, comprising an air-depolarized cell employing an alkaline electrolyte having a porous, activated and catalyzed polarizable carbon cathode exposed to a gaseous mixture, switch means connected to the positive terminal of said cell, a variable resistance connected to said switch means and to the negative terminal of said cell and an electric meter connected across said resistance, said variable resistance serving to apply a load on said cell when air passes therethrough until said meter reads 0.00 volt prior to placing said gaseous mixture in contact with said cathode.

2. A device for determining the oxygen content of a gaseous mixture comprising an air-depolarized sensing cell in a transformer-rectifier circuit, a gating circuit connected to said transformer-rectifier circuit through the positive terminal of said cell, and a compensating-circuit connected to said transformer-rectifier circuit through the negative terminal of said cell.

3. A device for determining the oxygen content in a gaseous mixture comprising an air-depolarized sensing cell employing an alkaline electrolyte and having an anode and a porous, activated and catalyzed polarizable carbon cathode adapted to be exposed to a gaseous mixture, a sensing circuit having a switch, an electric meter and a plurality of series-connected resistors electrically connected between said anode and cathode of said sensing cell, a compensating circuit connected in series with said sensing circuit through an electric meter, said compensating circuit including a switch, a source of direct current, a plurality of resistors in series with each other, and a wide resistance range potentiometer across said resistors.

References Cited in the file of this patent

UNITED STATES PATENTS

| | | |
|---|---|---|
| 1,578,666 | Katz | Mar. 30, 1926 |
| 2,097,077 | Oppenheim | Oct. 26, 1937 |
| 2,401,287 | Yant et al. | May 28, 1946 |
| 2,540,674 | Jacobson | Feb. 6, 1951 |
| 2,662,211 | Marko et al. | Dec. 8, 1953 |
| 2,759,038 | Marsal | Aug. 14, 1956 |